United States Patent
Nakamura (10) Patent No.: US 6,820,712 B2
(45) Date of Patent: Nov. 23, 2004

(54) DIFFERENTIAL LOCKING CONTROL SYSTEM

(75) Inventor: Kazuo Nakamura, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 10/013,583

(22) Filed: Dec. 7, 2001

(65) Prior Publication Data

US 2002/0070066 A1 Jun. 13, 2002

(30) Foreign Application Priority Data

Dec. 7, 2000 (JP) ........................................ 2000-372545

(51) Int. Cl.[7] .............................................. B60K 17/35
(52) U.S. Cl. ...................................... 180/249; 180/247
(58) Field of Search ................................ 180/247–249; 475/150, 199; 477/35

(56) References Cited

U.S. PATENT DOCUMENTS

| | | | | |
|---|---|---|---|---|
| 4,671,373 A | * | 6/1987 | Sigl ............................ | 180/197 |
| 4,681,185 A | * | 7/1987 | Hoernig et al. .............. | 180/247 |
| 4,751,856 A | | 6/1988 | Nakamura et al. ............ | 74/866 |
| 4,765,434 A | * | 8/1988 | Kawamoto et al. .......... | 180/249 |
| 4,792,012 A | * | 12/1988 | Morisawa et al. ........... | 180/247 |
| 4,883,138 A | | 11/1989 | Kameda et al. .............. | 180/249 |
| 4,955,853 A | * | 9/1990 | Bausch ........................ | 475/241 |
| 5,005,663 A | * | 4/1991 | Niide et al. .................. | 180/247 |
| 5,054,573 A | * | 10/1991 | Bennett ....................... | 180/244 |
| 5,071,392 A | * | 12/1991 | Stall et al. ................... | 475/150 |
| 5,125,490 A | | 6/1992 | Suzumura et al. .......... | 192/0.07 |
| 5,257,672 A | | 11/1993 | Ohtagaki et al. ............ | 180/249 |
| 5,314,378 A | | 5/1994 | Ohtagaki et al. ............ | 475/150 |
| 5,366,041 A | * | 11/1994 | Shiraishi et al. ............ | 180/248 |
| 5,451,188 A | | 9/1995 | Kraft et al. .................. | 475/237 |
| 5,505,267 A | | 4/1996 | Orbach et al. ................ | 172/3 |
| 5,902,489 A | * | 5/1999 | Yasuda et al. ............... | 210/748 |
| 5,980,415 A | * | 11/1999 | Showalter .................... | 180/247 |
| 6,016,883 A | | 1/2000 | Yamada ....................... | 180/247 |
| 6,038,506 A | * | 3/2000 | Diekhans et al. ............. | 701/88 |
| 6,085,138 A | | 7/2000 | Smith et al. .................. | 701/51 |
| 6,105,702 A | * | 8/2000 | Showalter .................... | 475/206 |
| 6,108,601 A | * | 8/2000 | Breithor et al. ............. | 701/182 |

FOREIGN PATENT DOCUMENTS

| | | |
|---|---|---|
| JP | 10-35314 | 2/1998 |
| JP | 10-35315 | 2/1998 |

* cited by examiner

Primary Examiner—Lesley D. Morris
Assistant Examiner—L. Lum
(74) Attorney, Agent, or Firm—Knobbe Martens Olson & Bear LLP (57) ABSTRACT

A vehicle has a lockable differential. The lockable differential generally comprises an actuator and a locking mechanism. The vehicle also has a motor. The actuator, the motor or both are controlled according to a control routine that reduces wear on the components by reducing the likelihood that a locked differential will be requested when locking is not very practical. In one arrangement, actuation only occurs below a preset threshold speed and can occur through a specified range defined between the preset threshold and a second threshold. In another arrangement, the motor speed is controlled when actuation is desired such that motor speed is reduced to a lockable speed range.

15 Claims, 6 Drawing Sheets

DIFFERENTIAL LOCKING CONTROL SYSTEM

RELATED APPLICATIONS

This application is related to and claims the priority of Japanese Patent Application No. 2000-372545, filed on Dec. 7, 2000, which application is hereby expressly incorporated by reference in its entirety.

BACKGROUND OF THE INVENTION

1. Field of the Invention

The present invention generally relates to a transmission system for a land vehicle. More particularly, the present invention relates to a locking differential control system that either varies engine output or controls actuation of the locking mechanism based in part upon engine speed.

2. Description of the Related Art

As is well known, a differential gear used on land vehicles divides power provided to it between two axles, which usually power two individual wheels. Under normal driving conditions, it is desirable to divide the input power nonuniformly such that the outside wheel (i.e., the wheel to the outside of the turn) can rotate faster than the inside wheel. The differential accomplishes this by apportioning the input power unequally between the wheels, as needed.

However, when increased traction is desired, some differential gears are constructed with a mechanism that locks-out the differential function. In other words, the two axles will be connected to ensure that both wheels receive the same power. Such an arrangement is helpful when it is necessary to travel over ice, mud, rocks and other low-traction environments. It is helpful in these environments because it is not desirable that one wheel spins more freely than another, particularly when this spinning means that all of the power is going to the spinning wheel.

Engagement of the differential lock can be difficult at higher speeds and can be undesirable at even higher speeds. For instance, as the vehicle speed increases, it often takes longer for the differential to achieve a locked-up state. This lengthy process of locking eventually can shorten the life of the differential locking components. In addition, when operating at higher speeds, the benefits of the locked-differential are decreased and the handling of the vehicle can be adversely affected. Moreover, operation at higher speeds in a locked state can further reduce the life of the differential and its locking components.

SUMMARY OF THE INVENTION

Accordingly, an arrangement is desired in which the timing of differential lock-up can be controlled. In addition, an arrangement that can limit the speeds at which the differential can be locked-up is desired.

One aspect of the present invention involves a method of controlling operation of a locking differential. The method comprises detecting a vehicle speed and, regardless of operator demand for an actuation of the locking differential, inhibiting the actuation of the locking differential unless the detected vehicle speed is below a predetermined vehicle speed that allows locking of the locking differential.

Another aspect of the present invention involves a method of controlling a locking mechanism of a differential in an all terrain vehicle. The method comprises detecting a vehicle speed, comparing the detected speed to a high-speed threshold and a low-speed threshold, and inhibiting actuation of the locking mechanism if the detected speed exceeds the high-speed threshold.

An additional aspect of the present invention involves a method of controlling a locking mechanism of a differential in a land vehicle. The method comprises detecting an operational mode of a drive train of the vehicle, allowing actuation of the locking mechanism at any speed if the operational mode is one of a two-wheel drive mode or a four wheel drive with locked differential mode, and limiting actuation if the operational mode is a four wheel drive with unlocked differential mode, wherein limiting actuation comprises detecting an operational speed of the vehicle, comparing the operational speed with a first threshold and a second threshold and inhibiting operation of an actuator of the locking mechanism if the detected speed exceeds the second threshold speed, which second threshold speed is higher than a vehicle speed that allows locking of the locking mechanism.

Yet another aspect of the present invention involves a method of controlling a vehicle comprising a locking differential. The locking differential comprises an actuator and a locking mechanism with the actuator being adapted to move the locking mechanism into a locked state. The method comprises detecting a state of the locking differential, detecting the speed of the vehicle and automatically limiting an operating speed of the vehicle to a speed below a preset low-speed threshold if the detected state is not the locked state and the detected speed is below the low-speed threshold.

A further aspect of the present invention involves a method of controlling a vehicle comprising a locking differential. The method comprises detecting a vehicle speed, comparing the detected vehicle speed to a first threshold and a second threshold, the first threshold being lower than the second threshold. The method further comprises detecting when locking the locking differential is demanded and inhibiting operation of the locking differential or allowing normal operation of an engine or both if the detected vehicle speed is greater than the second threshold, adjusting operation of the engine to maintain a speed of the vehicle below the first threshold or allowing operation of the locking differential if the detected vehicle speed is less than or equal to the first threshold, and maintaining a previous operational state of the locking differential or maintaining a previous operational state of the engine if the detected vehicle speed is between the first threshold and the second threshold.

BRIEF DESCRIPTION OF THE DRAWINGS

These and other features, aspects and advantages of the present invention will now be described with reference to the drawings of a preferred embodiment, which embodiment is intended to illustrate and not to limit the invention. The drawings comprise six figures.

DESCRIPTION OF THE PREFERRED EMBODIMENT

Figure 1:
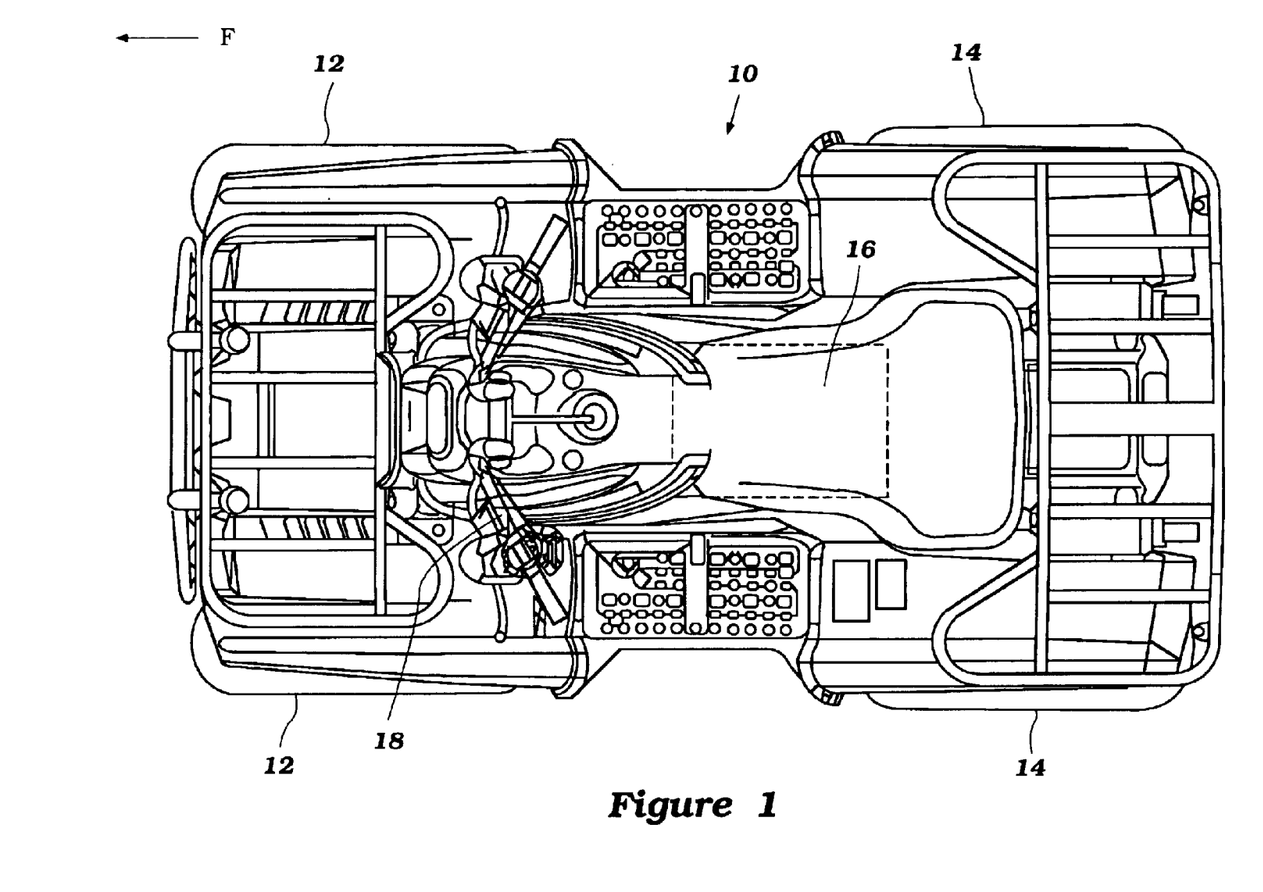
FIG. 1 is a top plan view of an exemplary vehicle with which certain features, aspects and advantages of the present invention have particular utility.

With reference now to FIG. 1, an all terrain vehicle is illustrated therein. The vehicle, indicated generally by the reference numeral 10, is illustrated and described because the vehicle 10 is one exemplary application for which the present control arrangement has particular utility. The present control arrangement also has applicability in other environments of use, such as, for example but without limitation, farm machinery, sport utility vehicles and the like.

The illustrated vehicle 10 generally comprises a frame assembly (not shown) that is supported by at least one front wheel 12 and at least one rear wheel 14. The vehicle 10 preferably comprises a pair of front wheels 12 and a pair of rear wheels 14. The wheels 12, 14 can be mounted to the frame in any suitable manner.

The frame also preferably defines an engine compartment in which a powering motor 16 is mounted. The motor 16 can be an internal combustion engine, an electric motor or any combination of the two. Any other suitable form of motor (i.e., motive member) also can be used.

The motor 16 is adapted to selectively drive the front wheels 12 and/or the rear wheels 16. In other words, the motor 16 can drive the rear wheels 14 at all times while having selective engagement with the front wheels 12 such that the vehicle 10 features on-demand four wheel drive capabilities. The motor can be connected to the driven wheels 12, 14 in any suitable manner, including but not limited to chain drives, belt drives and shaft drives. In one arrangement, the motor 16 drives a pair of drive shafts: one front shaft and one rear shaft. The front drive shaft, in turn, drives a pair of transversely extending half shafts through a front lockable differential. The half shafts are connected to the front wheels 12. The rear shaft is connected to a single rear axle that drives both rear wheels 14. Other arrangements also are possible.

In the illustrated arrangement, the motor 16 comprises an internal combustion engine. Such an engine generally comprises an intake system, a fuel supply system, an exhaust system and an ignition system. As is known, internal combustion engine speed can be controlled by manipulating either the intake system such that the air flow is increased or decreased, by manipulating the fuel supply such that the fuel amount is increased, decreased or stopped or by manipulating the ignition system such that the timing is advanced or retarded or such that the engine simply does not fire. By manipulating any combination of these variables or by manipulating any one of these variables, adjustments to engine speed can be achieved. As known, electric motors also have a number of manners of controlling engine speed.

With continued reference to FIG. 1, the vehicle 10 further comprises a control handle assembly 18. As is generally known, the control handle assembly 18 can be operatively connected to the front wheels 12 or the rear wheels 14, or both, such that steering of the vehicle 10 can be achieved. In one arrangement, the handle assembly 18 is mounted to a steering shaft that extends downward to a pitman arm. The steering shaft is supported by the frame assembly. The pitman arm can be connected to a pair of connecting rods that are secured to hubs associated with the front wheels. Thus, the steering shaft transfers movement of the handle assembly 18 to the pitman arm and the pitman arm pushes or pulls a portion of the front wheel hubs through the connecting rods. Other steering arrangements also can be used.

Figure 2:
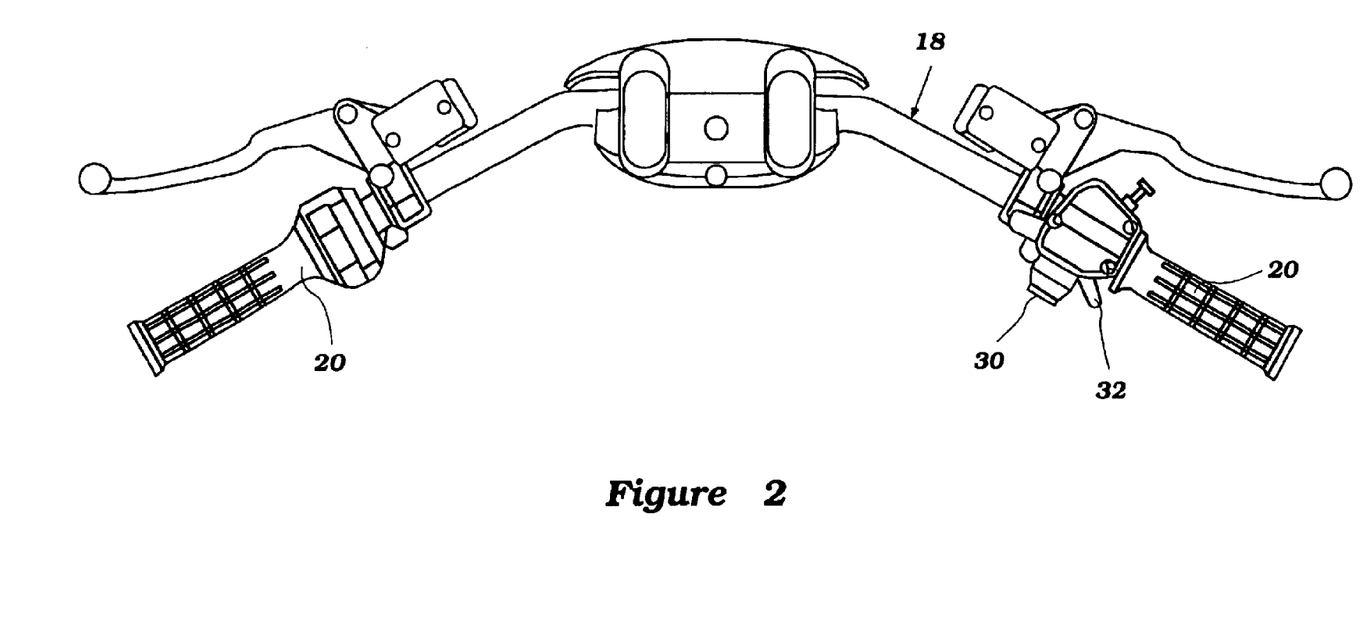
FIG. 2 is an enlarged top plan view of a handle bar assembly of the vehicle of Figure.

With reference now to FIG. 2, the control handle assembly 18 also provides a convenient mounting location for other operator controls and feedback devices. For instance, a pair of grips 20 can be mounted to the control handle assembly 18, one at each lateral end of the control handle assembly 18. An operator generally grasps the grips 20 while operating the vehicle 10 such that steering can be controlled.

Proximate one of the grips 20, a differential-lock selector switch 30 and a throttle control lever 32 are mounted. These components preferably are suitably mounted on the handle assembly 18 for ease of operation. In some arrangements, these components can be mounted in other locations. For instance, the selector switch 30 can be mounted at a suitable location on the body of the vehicle 10.

The throttle lever 32 can be mechanical or electrical in nature. In other words, the throttle lever may be connected to a mechanical linkage on a throttle body of the engine or the throttle lever may emit an electrical signal that controls positioning of a throttle valve and an electric fuel injection system in an internal combustion engine application.

Figure 3:
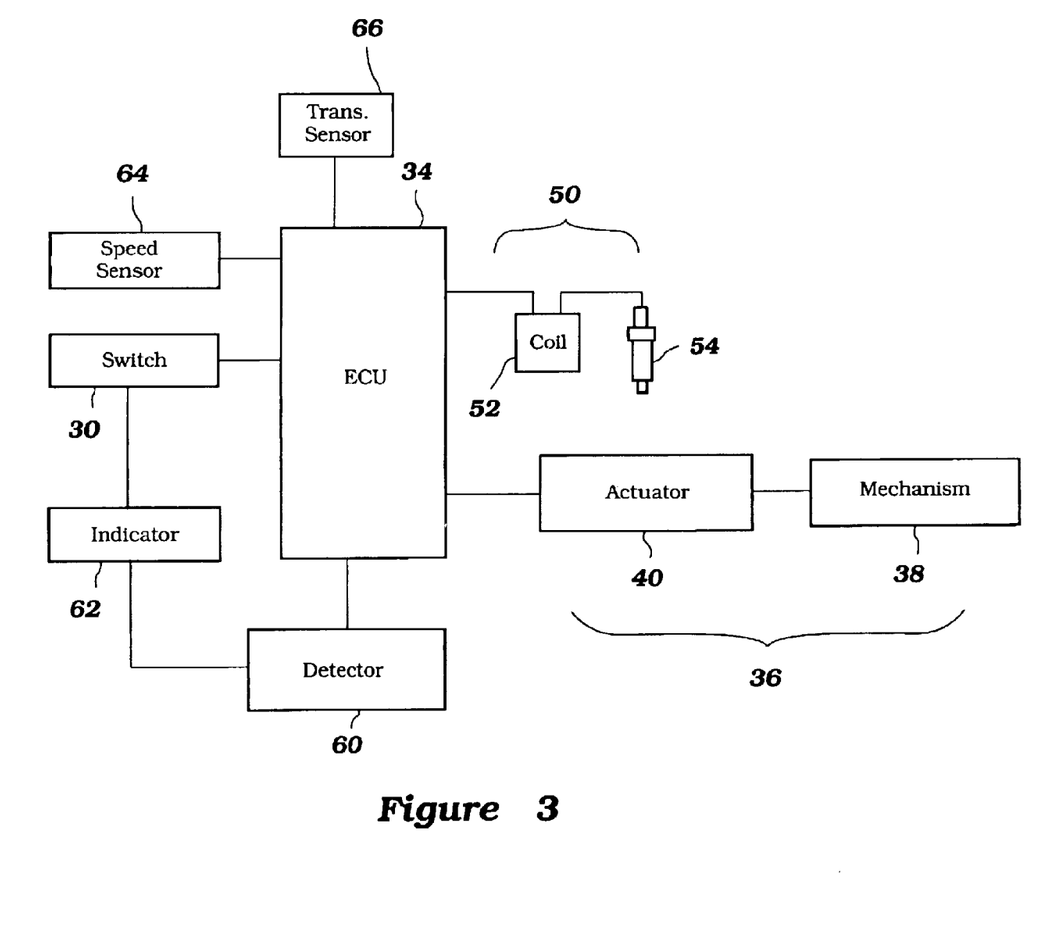
FIG. 3 is a schematic diagram of a control system arranged and configured in accordance with certain features, aspects and advantages of the present invention.

The selector switch 30 in the illustrated arrangement is a simple push-button switch. With reference to FIG. 3, the selector switch 30 in connected to an ECU 34. The ECU 34 can be mounted in any convenient location. In one arrangement, the ECU 34 is mounted proximate the motor 16.

The ECU 34 is connected to a locking differential 36. Many variations of suitable locking differentials 36 are currently manufactured and any suitable locking differential can be used. As used herein, the locking differential 36 also comprises a locking mechanism 38 and an actuator 40. Because the present invention generally relates to control of these components and not the particular construction of these components, further description is not necessary and any suitable constructions of these components can be used.

The actuator 40 generally controls movement of the differential locking mechanism 38. An operator desiring to lock the differential for improved traction can select a locked differential mode of operation with the selector switch 30. Once the locked mode is selected, operation of the actuator and the locking mechanism are controlled in manners that will be explained.

With reference again to FIG. 2, the ECU 34 generally controls a number of operations of the vehicle and the associated motor. For instance, the ECU controls an ignition system 50. In the illustrated arrangement, the ignition system 50 comprises an ignition coil 52 and a sparking member 54. Any suitable ignition system 50 can be used. When initiated by the ECU 34, the ignition coil 52 passes current to the spark plug 54, which ignites an air-fuel charge within the respective combustion chamber of the engine 16. The combustion of the air-fuel charge causes movement of a piston which, in turn, causes movement of the drive line.

As described above, the differential-lock switch 30 is operatively connected to the locking differential 36, and the actuator 40 in particular, through the ECU 34. The actuator 40 controls operation of the differential locking mechanism 38. Preferably, a differential lock detection device 60 also cooperates with the differential lock mechanism 38 to detect when the differential lock mechanism 38 is engaged or disengaged. The detection device 60 communicates with the ECU 34 and emits a signal to the ECU 34 that is indicative of whether the differential lock mechanism is engaged or disengaged. In one arrangement, the detection device 60 comprises a switch that is turned on when the differential lock clutch has moved to a position that will cause the differential lock mechanism 38 to be engaged.

A differential lock indicator 62 also is in communication with the illustrated ECU 34 such that the indicator 62 can be used to indicate whether a locked differential state has been selected by the operator of the vehicle 10 and whether differential lock has been established. In one arrangement, the indicator 62 flashes between the time that the differential lock mode has been selected and the time that differential lock has been established. In this arrangement, the indicator 62 is lit while the differential lock is established and is not lit while the differential lock mode is not selected. In another arrangement, the indicator 62 is not lit while the differential lock mode is not selected and the indicator 62 flashes when the differential lock mode is selected.

The ECU 34 also is connected to a vehicle speed sensor 64. Any suitable speed sensor 64 can be used. In one arrangement, the speed sensor picks up the revolution rate of the crankshaft and the speed of the crankshaft is communicated to the ECU. Thus, the crankshaft speed becomes a proxy for vehicle speed. In another arrangement, output of a speedometer type speed sensor is used to detect ground speed. For instance, a sensor can determine a wheel speed, an axle speed or another shaft speed.

The ECU 34 further communicates with a sensor 66 that detects whether the vehicle 10 is being operated in two wheel drive mode (2 WD) or four wheel drive mode (4 WD). Such a sensor can disposed to detect a position of a dog clutch that locks the transmission in either 2 WD or 4 WD. Any suitable sensor can be used.

As discussed above, one aspect of the present invention relates to control of the vehicle during manipulation of a differential locking actuator. As such, two presently preferred control routines that effectively control operation of at least one of the motor 16 and the locking differential 36 based upon vehicle operating characteristics are described below. The first routine generally controls operation of the actuator 40 based upon sensed speed and transmission operation mode (2 WD/4 WD). The second routine generally controls motor speed under certain operating conditions. The two routines that will be described can be implemented in any suitable manner, such as a subroutine of a larger operating system, for instance. In addition, certain features of each routine could be combined in some arrangements. For instance, but without limitation, the motor speed can be manipulated while also controlling whether the actuator 40 enables differential lock.

Figure 4:
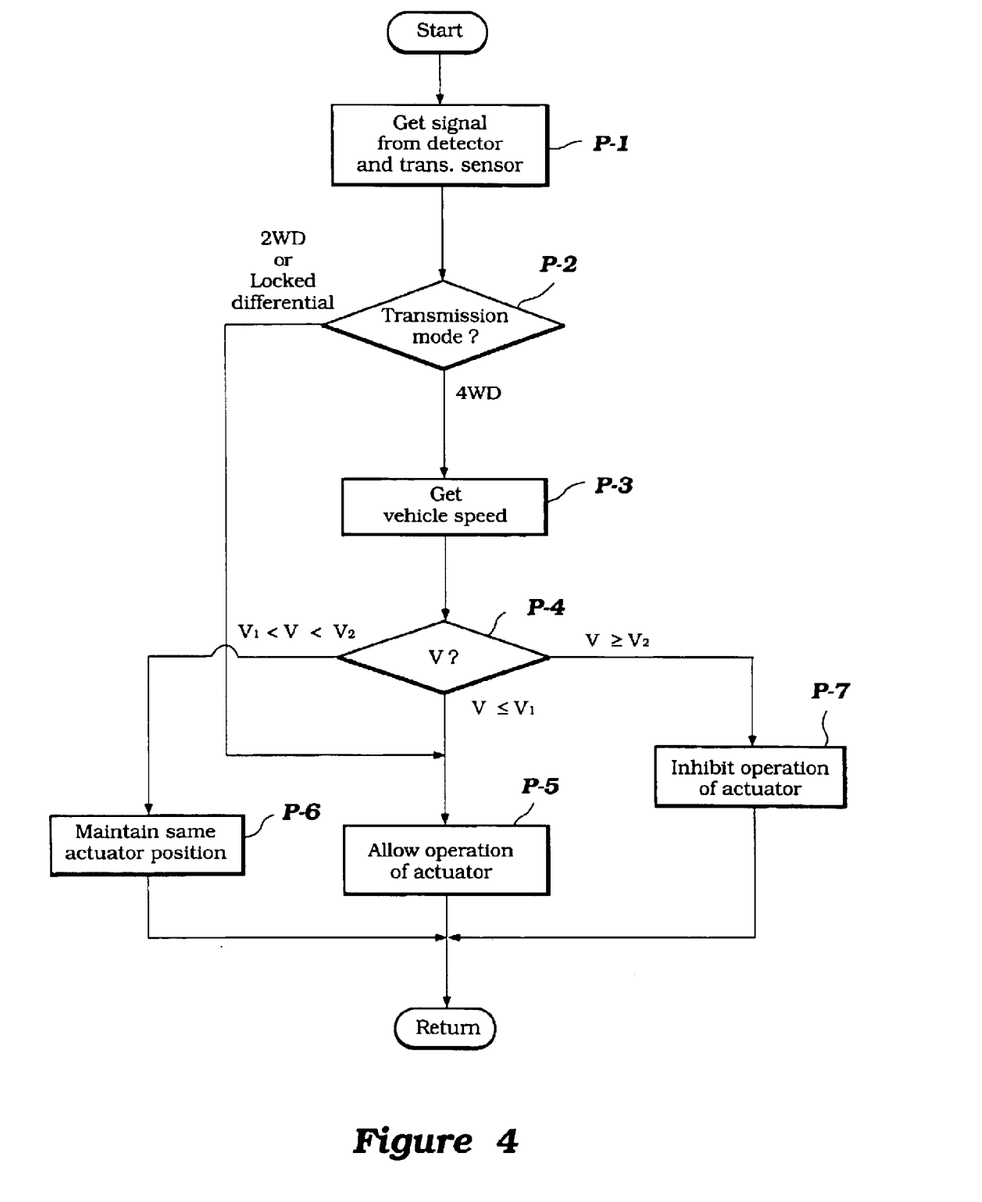
FIG. 4 is a first control routine having certain features, aspects and advantages of the present invention.

With reference now to FIG. 4, one of the presently preferred arrangements starts and begins detecting the signal of the differential lock detection device 60. The signal is used to detect whether or not the differential is presently locked. The ECU also receives a signal from the transmission sensor 66. This signal is used to detect whether the transmission is operating in 2 WD mode or 4 WD mode. See P-1. In a decision block, the current operating mode of the drive line is evaluated (i.e., differential lock, 2 WD or 4 WD). See P-2.

In the event that the transmission operating mode is 4 WD, then the routine obtains the current speed of the vehicle. See P-3. In a decision block, the sensed speed is compared to two different threshold levels: a low-speed threshold $V_1$ (e.g., about 5 km/hr) and a high-speed threshold $V_2$ (e.g., about 10 km/hr). See P-4. Preferably, the low-speed threshold is selected at a speed that does not cause undue delay between the time the actuator moves and the time the differential actually locks. Thus, slowing to a speed below the low-speed threshold generally would be necessary for ease of engagement of the differential lock. The high-speed threshold preferably is a speed that generally will not allow the differential lock to engage at all without substantial effort due to forces within the drive line. Thus, slowing below the high-speed threshold generally would be necessary to cause the differential lock to engage.

In the event that the sensed speed is lower than the low-speed threshold, then the differential locking actuator is permitted to operate when instructed by the operator through the selector switch 30. See P-5. Thus, the speed of the vehicle is low enough that fairly prompt engagement of the differential lock mechanism 38 can be established.

In the event that the sensed vehicle speed is between the two thresholds, the previous operating state of the differential locking actuator is maintained. See P-6. Thus, if the differential locking actuator 40 was not in a locking position, the actuator 40 would not move to a locking position in this speed range.

In the event that the sensed vehicle speed is above the high-speed threshold, then operation of the differential locking actuator is prohibited. See P-7. In this manner, the vehicle speed must be reduced before the differential can be locked. In effect, the vehicle speed would have to be reduced to below the low speed threshold before the actuator 40 could move.

At P-2, if the transmission currently is operating in two-wheel drive or if the differential lock is engaged, then operation of the differential locking actuator is permitted at any speed. Thus, the vehicle speed need not be reduced to lock the differential if the vehicle is operating in 2 WD and the vehicle speed need not be reduced to unlock the differential regardless of whether the vehicle is operating in 2 WD or 4 WD.

With reference now to FIG. 3, a further control arrangement having certain features, aspects and advantages of the present invention is illustrated. In this arrangement, signals are obtained from the differential-lock switch, the differential lock detection device 60 and the transmission sensor 66. See Q-1, Q-2. In a decision block, the operation state of the drive line is evaluated (i.e., locked differential, 2 WD or 4 WD). See Q-3.

Figure 5:
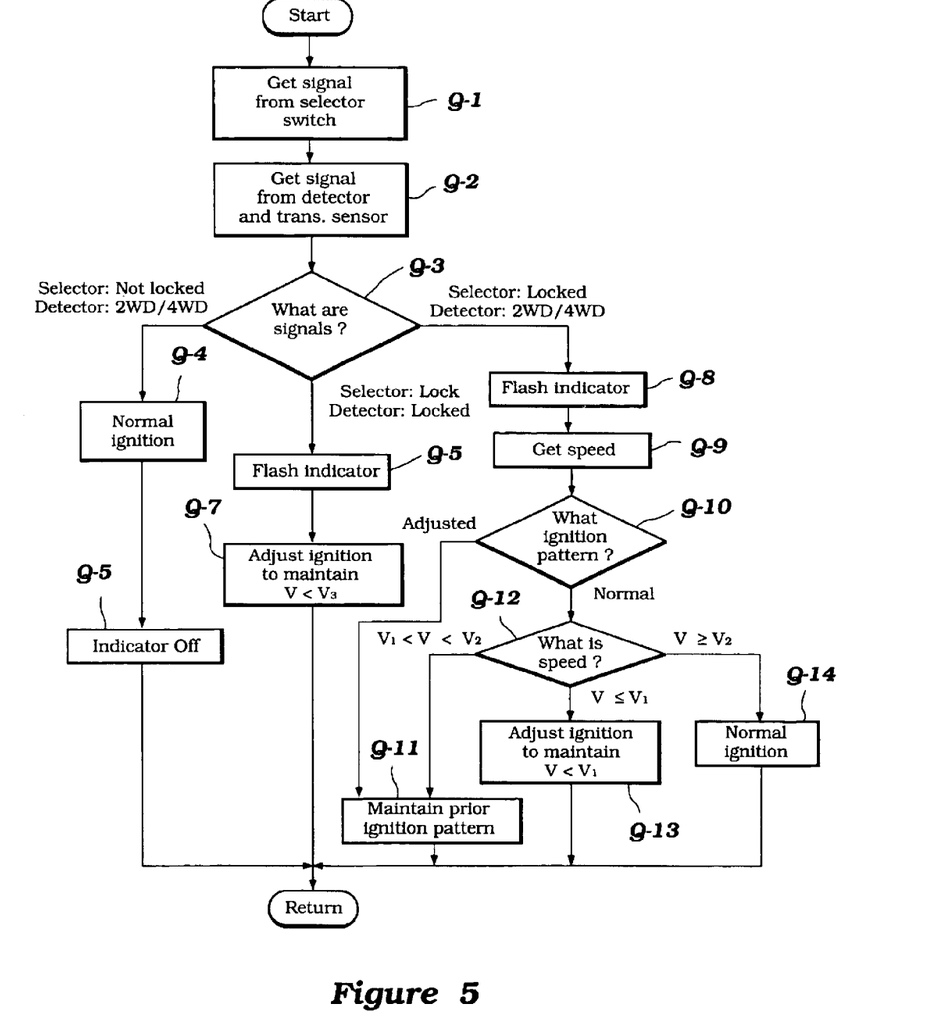
FIG. 5 is another control routine having certain features, aspects and advantages of the present invention.

If it is determined that an unlocked differential is being requested and that the differential is unlocked, then the ECU controls the ignition system 50 to maintain a normal firing mode (i.e., the ignition system is not adjusted to reduce engine speed). See Q-4. The ECU also maintains the indicator in an "off" state (e.g., unlit). See Q-5.

If it is determined that a locked differential is being requested and that the differential is currently locked, then the indicator is flashed (see Q-6) and the ignition system is adjusted to limit the vehicle speed to a level lower than a high-speed threshold (e.g., 40 km/hr). See Q-7. The high speed threshold in this arrangement preferably is a speed at which operation of the vehicle 10 with the differential locked would not be advantageous (e.g., added pulling power of locked differential is unnecessary).

If it is determined that a locked differential is being requested and that the differential currently is not locked, then the indicator 62 is flashed. See Q-8. The vehicle speed is then obtained. See Q-9. In a decision block, the ECU 34 determines how the ignition system 50 is currently being controlled. For instance, in the illustrated arrangement, the ECU 34 determines whether a normal ignition pattern is being used or whether a speed limiting ignition pattern is being used. See Q-10.

If the ignition system 50 already is being controlled to limit speed, then the routine simple continues using the same ignition pattern. See Q-11.

If the ignition system 50 is currently operating with a normal ignition timing, then the sensed speed is evaluated in a decision block Q-12.

In the event that the sensed speed is lower than a low-speed threshold, $V_1$ then the ignition is adjusted to maintain the vehicle speed below the low-speed threshold. See Q-13. In one arrangement, the low-speed threshold is about 5 km/hr, as discussed above. Notably, once the differential has locked, then the ignition will be adjusted to maintain the sensed speed below the high speed threshold, which is about 40 km/hr in a presently preferred arrangement. Thus, prior to engagement of the lock mechanism 38, the speed of the vehicle 10 is maintained at a speed low enough that fairly prompt engagement of the differential lock mechanism 38 can be established.

In the event that the sensed vehicle speed is between the two thresholds, the previous ignition timing is maintained. See Q-11. Thus, the vehicle speed would be reduced under the control of the ECU until the speed was below the low-speed threshold.

In the event that the sensed vehicle speed is above an intermediate-speed threshold, then the ignition timing remains normal because differential lock most likely would not be accomplished at that speed. See Q-14. In this manner, the vehicle speed must be reduced before the differential can be locked. In effect, the vehicle speed would have to be reduced to below the low speed threshold before locking could occur. In the illustrated arrangement, the vehicle speed would be reduced by ignition timing adjustments.

Figure 6:
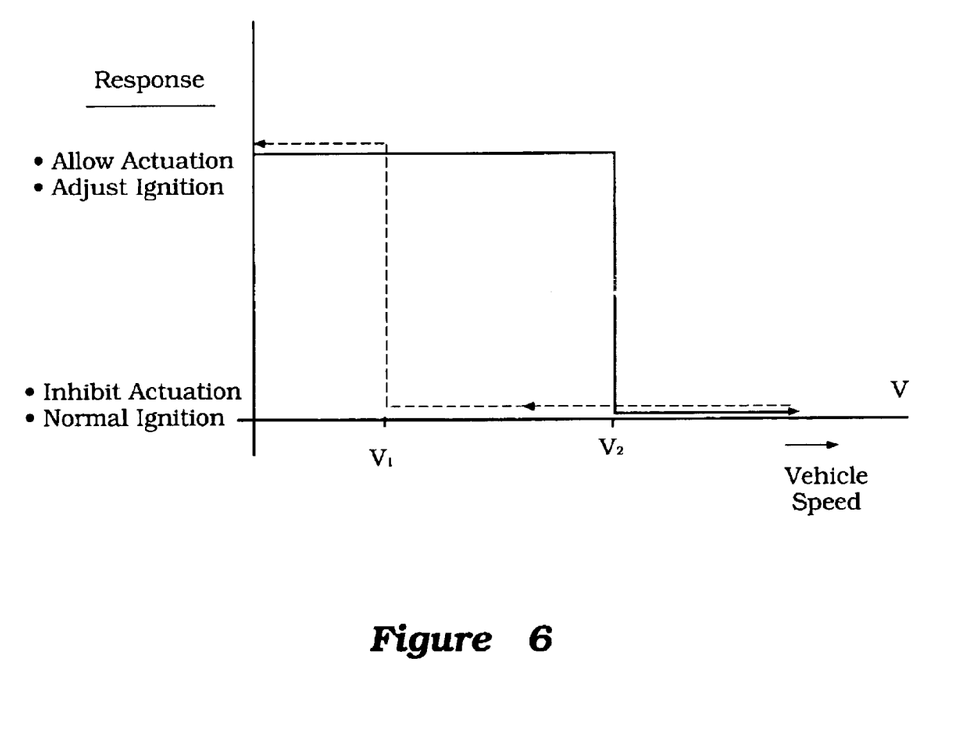
FIG. 6 is a graphical illustration showing control of actuator operation/ignition timing based upon vehicle speed.

With reference now to FIG. 6, an effect of both of the above-described arrangements will be graphically described. As shown by the solid line, during acceleration of the vehicle, operation of the actuator is permitted and/or ignition timing is adjusted until the vehicle exceeds $V_2$, which is the high-speed threshold in the arrangement of FIG. 4 and the intermediate-speed threshold in the arrangement of FIG. 5. Once the vehicle speed has exceeded this threshold, actuation is inhibited and/or ignition timing is maintained as normal. Notably, this region accounts for selector switch operation that begins at speeds above $V_2$ in the arrangement of FIG. 5 because the vehicle speed will be reduced by ignition timing at speeds below $V_2$. As shown by the dashed line in FIG. 6, during deceleration of the vehicle, operation of the actuator is inhibited and/or normal ignition timing is maintained until the vehicle speed reaches the low-speed threshold $V_1$. Once the speed has dropped below $V_1$, then actuation is permitted and/or ignition timing is adjusted.

Accordingly, the above-described arrangements of the control routines advantageously allow the differential to lock at speeds in which the added pulling power of the locked differential is most desired. Additionally, the arrangements limit the attempts to lock the differential when the vehicle is operating at speeds where the added power would be less desired and where the attempted locking could reduce the life of the locking components.

While the above-described arrangements each contemplate a software routine, other methods of implementing the routines also can be used. For instance, the arrangements can be accomplished through hard wiring and the like. Additionally, the two arrangements described above preferably are part of a larger control configuration of the vehicle and form only subroutines performed as desired.

Moreover, although the present invention has been described in terms of certain arrangements, other arrangements apparent to those of ordinary skill in the art also are within the scope of this invention. Thus, various changes and modifications may be made without departing from the spirit and scope of the invention. For instance, various steps and processes of the routines may be repositioned or combined as desired. In addition, in some arrangements, the operator switch 30 may be replaced by an automatically controlled engagement control. Thus, the ECU or another controller can be used to determine when locking of the differential is desired, such as by sensing slippage of a wheel. Furthermore, not all of the features, aspects and advantages are necessarily required to practice the present invention. Accordingly, the scope of the present invention is intended to be defined only by the claims that follow.

What is claimed is:

1. A method of controlling a locking mechanism of a differential in an all terrain vehicle, the method comprising sensing a transmission operational mode, detecting a vehicle speed, comparing said detected speed to a high-speed threshold and a low-speed threshold, always inhibiting actuation of said locking mechanism if:

(1) said transmission operational mode is four-wheel drive and said detected speed exceeds said high-speed threshold, or (2) said transmission operational mode is four-wheel drive and said detected speed is between said low-speed threshold and said high-speed threshold when actuation is selected until said detected speed is decreased below said low-speed threshold.

2. The method of claim 1, wherein actuation of said locking mechanism is allowed at any speed if said transmission operational mode is two-wheel drive or the differential is in a locked state.

3. A method of controlling a locking mechanism of a differential in a land vehicle, the method comprising detecting an operational mode of a drive train of said vehicle, allowing actuation of said locking mechanism at any speed if said operational mode is one of a two-wheel drive mode or a four wheel drive with locked differential mode, limiting actuation if said operational mode is a four wheel drive with unlocked differential mode, wherein limiting actuation comprises detecting an operational speed of said vehicle, comparing said operational speed with a first threshold and a second threshold and inhibiting operation of actuator of said locking mechanism if said detected speed exceeds said second threshold speed, which second threshold speed is higher than a vehicle speed that allows locking of said locking mechanism.

4. The method of claim 3, wherein limiting actuation further comprises allowing operation of said actuator once said operation is desired until said detected speed exceeds said second threshold speed.

5. The method of claim 3, wherein limiting actuation further comprises allowing operation of said actuator if said detected speed is less than or equal to said first threshold.

6. The method of claim 5, wherein limiting actuation allows continued actuation if said actuation is sought to be initiated at a speed between said first threshold until said detected speed exceeds said second threshold.

7. The method of claim 3, wherein limiting actuation further comprises inhibiting actuation if said actuation is sought to be initiated at a speed greater than said second threshold and said detected speed is above said first threshold.

8. The method of claim 7, wherein limiting actuation further comprises allowing actuation if said actuation is sought to be initiated at a speed greater than said second threshold and said detected speed decreases below said first threshold.

9. A method of controlling a vehicle comprising a locking differential, the locking differential comprising an actuator and a locking mechanism, the actuator being adapted to move the locking mechanism into a locked state, the method comprising detecting a state of the locking differential, detecting the speed of the vehicle and automatically limiting an operating speed of said vehicle to a speed below a preset low-speed threshold if said detected state is not said locked state and said detected speed is below said low-speed threshold.

10. The method of claim 9 further comprising temporarily limiting said operating speed of said vehicle to a speed below said preset low-speed threshold if said detected vehicle speed is below a preset intermediate-speed threshold that is higher than said preset low-speed threshold.

11. The method of claim 10 further comprising not limiting said operating speed of said vehicle if said detected vehicle speed is above said preset intermediate-speed threshold.

12. The method of claim 9 further comprising limiting said operating speed of said vehicle to a speed below a high-speed threshold if said detected state is said locked state.

13. The method of claim 12, further comprising not limiting said operating speed of said vehicle if said detected state is not said locked state and a locked state is not being demanded.

14. A method of controlling a lockable front differential in an all terrain vehicle, the lockable front differential being adapted to selectively couple both of a pair of steerable front wheels to a power source, the method comprising:

determining a current operational state of said vehicle;

allowing operation of an actuator to disengage said lockable front differential if said current operational state of said vehicle is either two wheel drive or four wheel drive with a locked front differential;

determining if a current vehicle speed is lower than a high speed threshold or lower than a low speed threshold if said current operational state of said vehicle is four wheel drive with an unlocked front differential;

inhibiting operation of said actuator to engage said lockable front differential if said current operational state of said vehicle is four wheel drive with an unlocked front differential and said current vehicle speed is higher than said high speed threshold and allowing operation of said actuator to engage said lockable front differential if said current operational state of said vehicle is four wheel drive with an unlocked front differential and said current speed is lower than said low speed threshold.

15. A method of controlling a lockable front differential in an all terrain vehicle, the lockable front differential being adapted to selectively couple both of a pair of steerable front wheels to a power source, the method comprising:

determining a current operational state of said vehicle;

determining if a current vehicle speed is lower than a high speed threshold or lower than a low speed threshold if said current operational state of said vehicle is four wheel drive with an unlocked front differential;

inhibiting operation of an actuator to engage said lockable front differential if said current operational state of said vehicle is four wheel drive with an unlocked front differential and said current vehicle speed is higher than said high speed threshold and allowing operation of said actuator to engage said lockable front differential if said current operational state of said vehicle is four wheel drive with an unlocked front differential and said current speed is lower than said low speed threshold.

* * * * *

UNITED STATES PATENT AND TRADEMARK OFFICE
CERTIFICATE OF CORRECTION

PATENT NO.     : 6,820,712 B2
DATED          : November 23, 2004
INVENTOR(S)    : Kazuo Nakamura It is certified that error appears in the above-identified patent and that said Letters Patent is hereby corrected as shown below:

Title page,
Item [56], References Cited, U.S. PATENT DOCUMENTS, delete "701/182" and insert therefore -- 701/82 --.

Column 8,
Line 45, after "operation of" insert -- an --.

Signed and Sealed this

Twenty-ninth Day of November, 2005

JON W. DUDAS
*Director of the United States Patent and Trademark Office*